(12) United States Patent
Murray et al.

(10) Patent No.: US 6,470,621 B2
(45) Date of Patent: Oct. 29, 2002

(54) MOLDED DUCK DECOY

(75) Inventors: Scott L. Murray, East Lansing, MI (US); William Humphreys, Heath, OH (US)

(73) Assignee: SSDW, LLC, Perrysburg, OH (US)

( * ) Notice: Subject to any disclaimer, the term of this patent is extended or adjusted under 35 U.S.C. 154(b) by 0 days.

(21) Appl. No.: 09/902,455

(22) Filed: Jul. 10, 2001

(65) Prior Publication Data

US 2002/0020101 A1 Feb. 21, 2002

Related U.S. Application Data

(60) Provisional application No. 60/217,998, filed on Jul. 13, 2000.

(51) Int. Cl.[7] ............................................. A01M 31/06
(52) U.S. Cl. ................................................... 43/3
(58) Field of Search ................................. 43/3, 2

(56) References Cited

U.S. PATENT DOCUMENTS

| | | | | |
|---|---|---|---|---|
| 2,222,996 A | * | 11/1940 | Armstrong | 43/3 |
| 2,453,758 A | * | 11/1948 | Risch | 43/3 |
| 2,518,721 A | * | 8/1950 | Risch | 43/3 |
| 2,755,588 A | * | 7/1956 | Johnson | 43/3 |
| 2,880,544 A | * | 4/1959 | Crummer et al. | 43/3 |
| 2,893,154 A | * | 7/1959 | McKee | 43/3 |
| 3,867,492 A | * | 2/1975 | Drostholm | 264/46.6 |
| 3,888,032 A | * | 6/1975 | Gagnon | 43/3 |
| 4,073,397 A | * | 2/1978 | Snodgrass | 215/1 |
| 4,450,642 A | * | 5/1984 | DeKezel et al. | 43/3 |
| 4,691,463 A | * | 9/1987 | DeKezel et al. | 43/3 |
| 5,608,983 A | * | 3/1997 | Adams | 43/3 |

OTHER PUBLICATIONS

Brochure from Blackwater Industries, Inc. describing their Rough Rider Decoys™ (2000).

* cited by examiner

*Primary Examiner*—Charles T. Jordan
*Assistant Examiner*—Danielle Rosenthal
(74) *Attorney, Agent, or Firm*—Emch, Schaffer, Schaub & Porcello Co., L.P.A.

(57) ABSTRACT

A water fowl decoy has an outer buoyant layer molded around an inner buoyant core material contained within the outer shell. The outer shell has a bottom opening for receiving a removable keel. The opening has front and rear walls with at least one indentation. The keel has a front edge and a rear edge with at least one detent which matingly engages the corresponding indentations on the front and/or side walls of the opening in the outer shell.

8 Claims, 2 Drawing Sheets

MOLDED DUCK DECOY

This application claims the benefit of 60/217,998, filed Jul. 13, 2000

The present invention relates to a floating water fowl decoy used for hunting.

BACKGROUND OF THE INVENTION

Hunters often use decoys to attract prey into an area which the prey would consider safe. Water fowl decoys are well known which mimic the shape and coloration of a water fowl. Various types of decoys are used on land while other types of decoys are used to float in water. The floating decoys are placed by the hunter in water to which the ducks are attracted. The decoys typically have a fowl shaped body made of a buoyant material using a variety of methods. Early decoys were carved from wood which often became water logged and did not last long. Later, decoys were carved from cork. While the cork decoys were more buoyant and lighter to carry, the cork decoys also degraded over time. Recently, most decoys are produced from blow-molded plastic. The decoys are inexpensive and very light weight. However, these decoys are easily damaged and must be replaced often.

Decoys have also been made from styrofoam with cloth covers. However, these decoys are easily torn and destroyed. Also, decoys have been made from urethane foam which produces a solid foam decoy. The solid foam decoy is, however brittle and therefore subject to breakage. This type of foam decoy does not allow the decoy to have detailed features to more accurately mimic a live water fowl.

In addition, the previous decoys have keels which are fixed and have molded fixed heads. Since water fowl typically have their heads in several different positions while swimming, floating, eating or cleaning themselves, many versions of each species of duck decoys must be made. Various duck decoys have been made with moveable heads to eliminate the need for different versions of each species of decoy.

Further, decoys are used in various depths of water, such as in swamps with minimal water depth or more open waters with high waves. The decoys are subject to further abuse since they sometimes are put on the shore as ground decoys. Further, the decoys are hauled to and from the sites where the hunters are hunting and the decoys are handled roughly. The decoys are thrown in and out of the storage trucks or boats. Further, they may be chewed on by the hunting dogs or accidentally shot. Therefore, the hunters must often replace the worn or broken decoys with new decoys.

Therefore, there is a need for an improved water fowl decoy which does not have the many drawbacks discussed above.

SUMMARY OF THE INVENTION

The present invention relates to a water fowl decoy having excellent detail. The decoy has an outer body shell which is molded in a mold such that fine detailing and feathering and structural wing curvature and tail design can be imparted to the outer body shell. The decoy has a head component which can also be molded in a hard mold with few parting lines or in a flexible mold. In a preferred embodiment, a flexible mold is used to minimize parting lines between the head and/or the body such that the decoy has a more desirable appearance.

The outer body shell of the decoy has a realistic exterior which resembles a particular water fowl being hunted. The outer shell is molded and/or painted in any desired shape or color to lure the desired game. The molded shell has a surface that readily accepts paint or other coatings to mimic the feathering the desired water fowl. A buoyant core material is contained within the outer shell. The buoyant core material is less dense than the outer body shell. A removable keel is positioned at the bottom of the outer shell.

In a preferred embodiment, the outer shell is made of a urethane microcellular elastomer material, preferably having a density of between about 15 to 45 lbs/cu ft. while the buoyant core material is made of an encapsulated light weight material such as urethane foam or a styrene material, such as Styrofoam® and typically has a density of between about 1.0 to 8.0 lbs/cu ft. The differences in the density between the buoyant core material and the outer shell allow the decoy to float at a preferred depth in a body of water.

In preferred embodiments, the core material comprises a urethane foam material. According to a novel aspect of the present invention, the densities of the outer shell material and the buoyant core material are within ranges that permit the decoy to have a waterline (i.e., sit in the water at a desired depth) that substantially mimics the relative water level position of where a live fowl sits in the water. That is, a duck decoy will generally be different from a goose decoy.

Further, the buoyant core material provides the water fowl with a sufficient buoyancy such that the decoy remains in an uprighted position. The decoy typically floats in the water like a real bird because the outer shell provides sufficient weight to the decoy while the keel aids in keeping the decoy upright in the water.

In a preferred embodiment, the keel can be removed from the decoy such that the decoy can either be used in the water with the keel inserted into the outer shell or the keel can be removed for placement of the decoy on the ground.

It is a primary object of the present invention to provide a water fowl decoy system which is both realistic and durable. The decoy of the present invention floats well and is realistic in its markings. The decoy of the present invention does not easily ding, dent, crack or break. The decoy is generally unaffected by environmental conditions such as exposure to oil and gasoline, extreme temperatures, a stray shot, or damage by animals.

Another object of the present invention is to provide a decoy which accepts a variety of different types of heads which are available in different poses for attaching to the body of the decoy.

It is a further object of the present invention to provide a decoy which accepts paint or other coating finishes which remain coatings flexible and do not chip or flake off. The coatings withstand seasons of harsh environments with little maintenance.

It is a further object of the present invention to provide a decoy with a fixed or removable keel that provides the decoy with stability and buoyancy.

These and other objects and advantages of the present invention will be apparent in the course of the following description.

DETAILED DESCRIPTION

Figure 1:
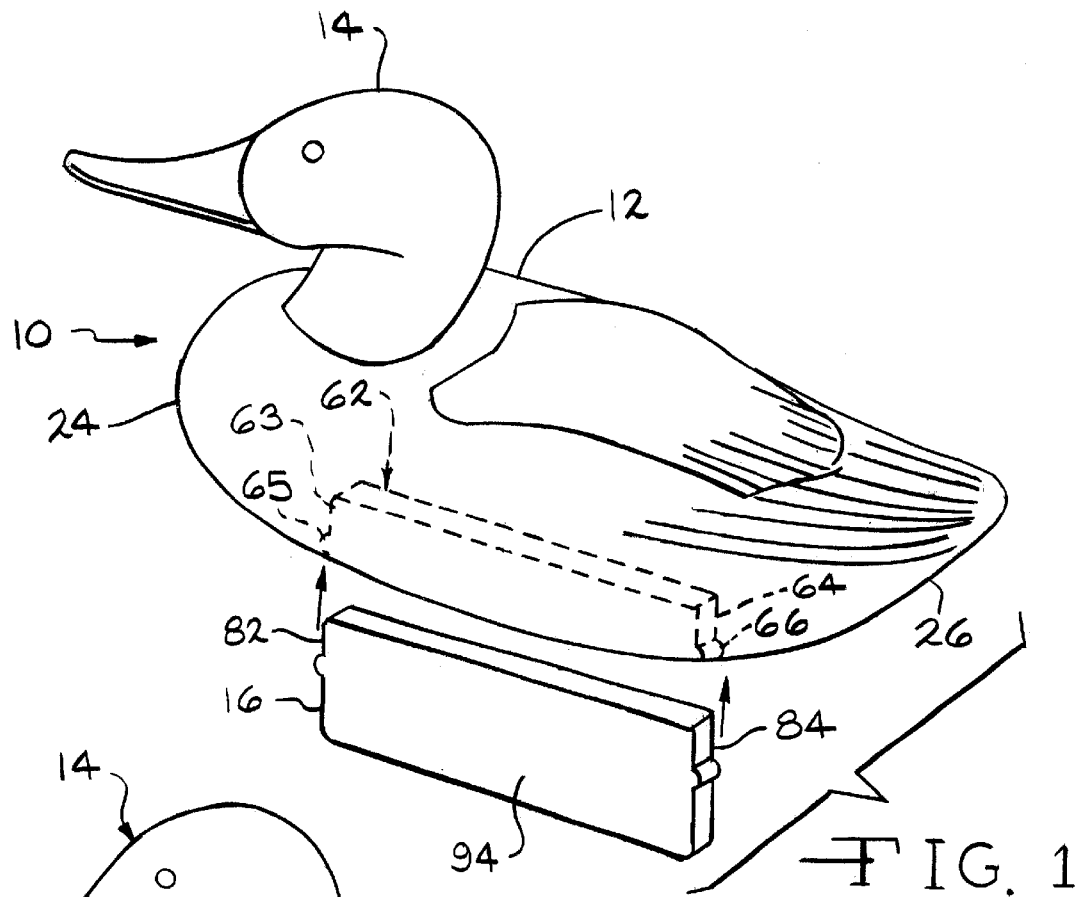
FIG. 1 is an exploded perspective view, partially in phantom, of a decoy with a removable keel.
Figure 2:
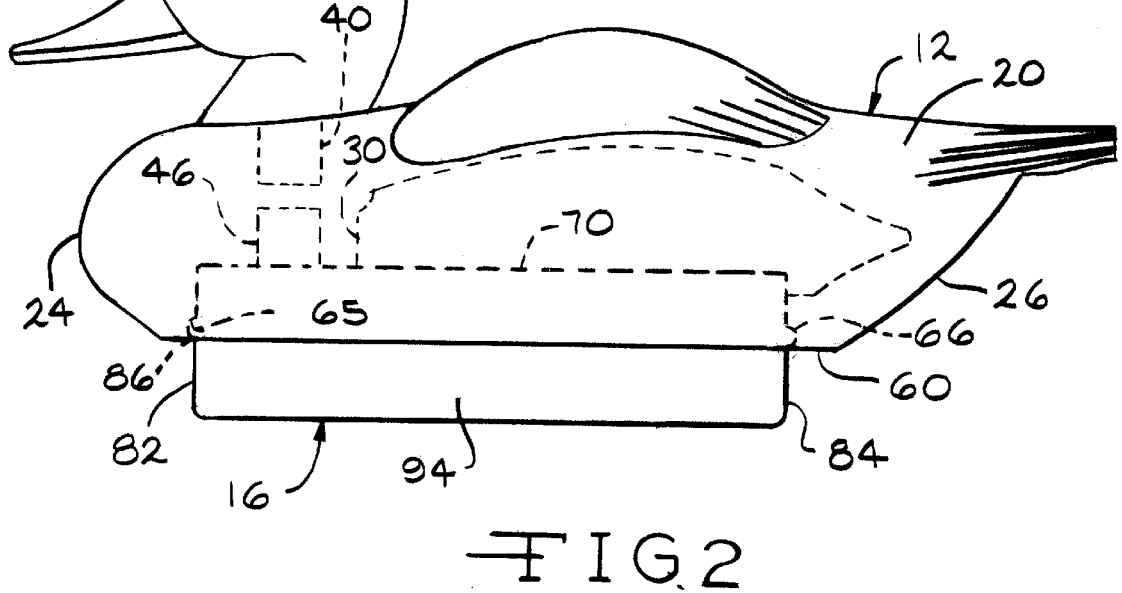
FIG. 2 is a side elevation view, partially in phantom, of a decoy.

Referring now to FIG. 1, there is illustrated a decoy 10 in the shape of a duck constructed in accordance with the teaching of the present invention. While the duck is depicted as the decoy for the purpose of illustration, is to be understood that the decoy can have the shape of any desired water fowl. The decoy 10 includes a body 12 generally having specific features such as wings and tail. The decoy further includes a head 14 which is positioned on the body 12. The decoy 10 further includes a keel 16.

Figure 3:
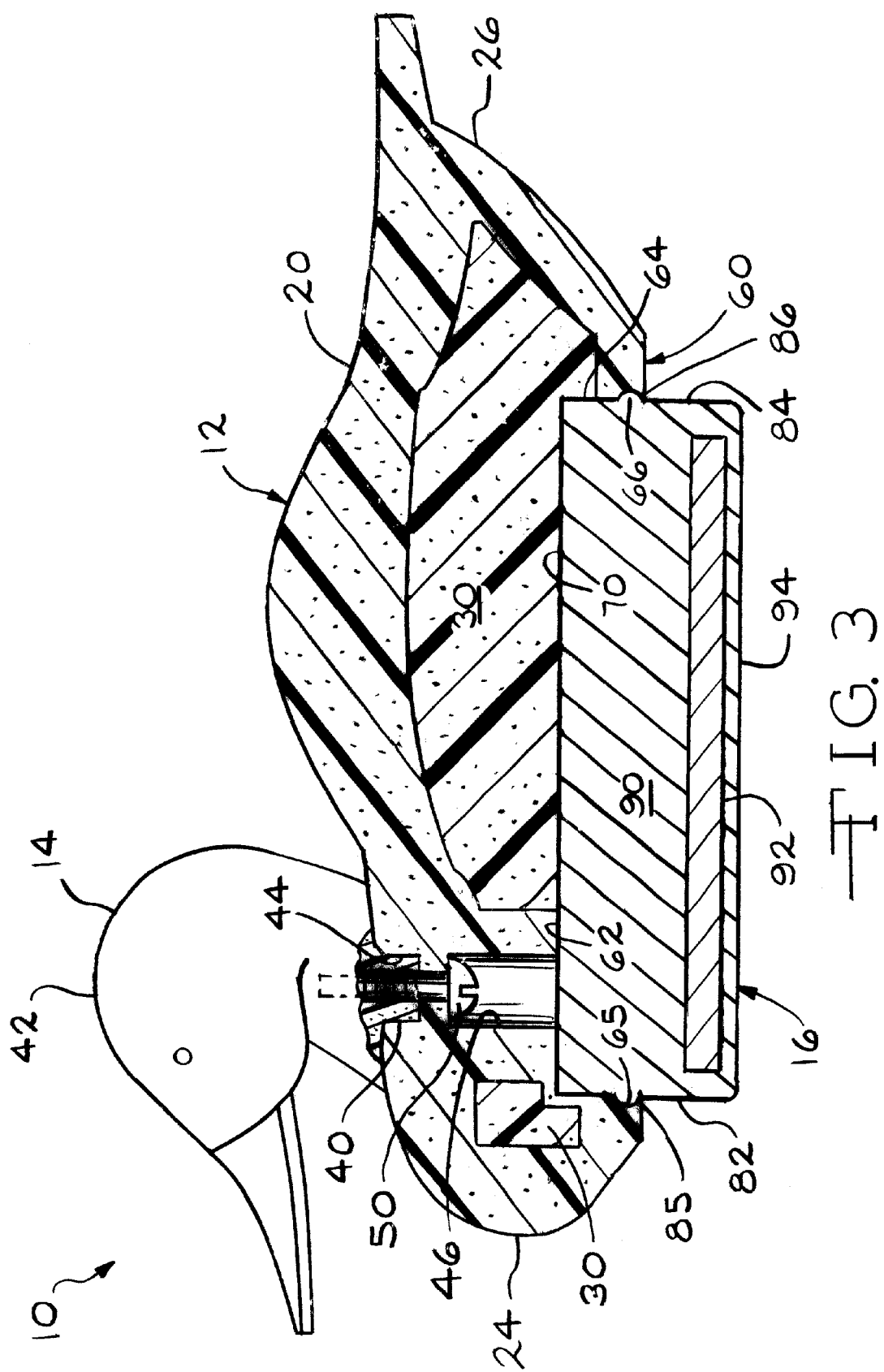
FIG. 3 is a partial cross-sectional view, partially in phantom, of a decoy.

As shown in FIG. 3, the body 12 comprises an outer shell 20 made of a suitably dense material such as urethane microcellular elastomer material preferably having a density of between about 15 to 45 lbs/cu ft. The outer shell 20 has a front end 24 and a rear end 26.

A buoyant core material 30 is contained within the outer shell 20, as will be explained in detail below. The buoyant core material 30 substantially extends from the front end 24 to the rear end 26 of the decoy 10. The buoyant core material 30 provides the decoy 10 with suitable balance such that the decoy 10 rides in the water in a realistic manner.

It is desired that the buoyant core material 30 have a density less than the outer shell 20. In a preferred embodiment, the buoyant core material has a density of between about 1.0 to about 8.0 lbs/cu ft.

The head 14 can be molded integrally with the body 12. Alternatively, as is shown in FIG. 3, the head 14 can be molded as a separate component either in a hard mold with parting lines or in a flexible mold which is made of a suitable rubber or silicon material. In various embodiments, the use of a flexible mold is preferred since the absence of parting lines or the minimization of parting lines provides a decoy product with a more desirable and realistic appearance.

The head 14 defines an extending peg 40 which extends in a downward direction from the top 42 of the duck. The outer shell 20 defines an exterior opening 44 which receives the peg 40 of the head 14. The outer shell 20 also defines an interior opening 46 which is in axial alignment with the exterior opening 44.

A suitable fastening means 50 is axially inserted through the interior opening 46 and can be tapped or screwed through the outer shell 20 and into peg portion 40 of the head 14. The fastening means 50 allows the user to detach a head having one configuration and replace a different head having a different configuration onto the body 12 of the decoy 10.

The body 12 of the outer shell 20 has a bottom 60 which generally defines an opening 62. The opening 62 has longitudinally extending sides 64 which extend from the front end 24 of the decoy 10 to the rear end 26 of the decoy 10. The opening 62 also has a front side 63 and a rear side 64. The front side 63 defines at least one indentation 65 and the rear side 64 defines at least one indentation 66.

The buoyant core material 30 also defines an opening 70 which is coaxially aligned with the opening 62 and extends longitudinally from the front end 24 to the rear end 26 of the decoy 10. The coaxially aligned openings 62 and 70 define a space for receiving the keel 16.

The keel 16 is made of a suitably rigid material which allows the decoy to remain in an upright position in the water. The keel 16 has a first edge 82 and an opposing or rear edge 84. At least one of the rear and/or front edges 82 and/or 84 define at least one detent 85 and 86, respectively, which matingly connects with the indentations 65 and 66, respectively, when the keel 16 is pushed or snapped into position in the coaxially aligned openings 62 and 70. The keel 16 can be removable from the outer shell 20 such that the decoy can sit in a relatively horizontal position on the ground when the decoy is not to be used in the water.

The keel 16 can be comprised of any suitable material such as plastic or wood. In a preferred embodiment, the keel 16 comprises a thermoplast-type material 90 which is molded around at least one suitable weight 92, such as a steel bar. It is also within the contemplated scope of the present invention that the keel 16 can comprise a wood material which has a milled out section to receive the weight 92. The remaining portion of the milled out section of the wood material can be then filled with a suitable wood epoxy material (not shown). The weight 92 is preferably positioned adjacent a lower edge 94 of the keel 16 to aid in keeping the decoy 10 in an upright position. In a preferred embodiment the weight 92 substantially extends from an area adjacent the front edge 82 of the keel 16 and extends to an area adjacent the rear edge 84 of the keel 16. However, it is to be understood that it is within the contemplated scope of the present invention, that more than one weight 92 can be positioned within the keel 16 in order to provide suitable stability to the decoy.

The dove tailing of the indentions 65 and 66 and the detents 85 and 86, respectively, allow the keel 16 to be removed from the decoy 10 without damage. Further, the urethane outer shell has suitable resiliency to hold the keel in place, yet allow the keel to be snapped out or removed from the outer shell 20 of the body 12.

The urethane microcellular elastomer material comprising the outer shell 20 has elastic properties which help it resist damage. The urethane microcellular elastomer material is also very tough and resists cuts even from knives or accidental gunshot. The urethane microcellular elastomer material does not easily break when exposed to any normal handling conditions which, as described above, are often rough and unforgiving.

It is a desirable attribute of a decoy to have the decoy sit at an optimum position in the water because a duck rides low in the water. The present invention allows the decoys to float a desired depth in the water rather than bobbing up and down or riding on top of the water. The preferred density of the urethane outer shell material coupled with the density and amount of the lightweight buoyant core material allows the decoy to sit lower in the water than blow-molded decoys, cork foam, styrofoam and other previous light weight structural decoys.

The urethane microcellular elastomer material forming the bottom 60 of the decoy 10 is of a sufficient thickness to allow the keel 16 to be retained in the opening 62. The urethane material has sufficient elasticity to allow the keel 16 to be easily attached and removed. The keel 16 has the detents 85 and 86 formed into the sides 82, and 84 of the keel 16 to allow the keel to be readily positioned within and then removed from the decoy. One advantage of the present invention is that a single keel size may be used for decoys having different shapes and sizes.

The method for making the water fowl decoy preferably comprises positioning at least one buoyant core member within a space defined by a mold (not shown). Preferably, the molding is done in a silicone or silicone rubber flexible mold. A flexible mold is sufficiently pliable to allow the decoy to be easily removed from the mold to eliminate or minimize parting lines. Further, very little mold flash occurs when using the urethane microcellular elastomer material which makes this method of production both efficient and safe. The pliable mold defines an outer shape of a particular desired water fowl. The buoyant core material is removably mounted on a fixture (not shown). In a preferred embodiment, the fixture has a generally narrow rectangular shape similar to the shape of the keel. The space between the buoyant core material and the pliable mold is filled with the suitable outer shell mold material.

It is preferable that the substantially liquid reaction injection mixture of the urethane microcellular elastomeric material be injected into the mold insert which accurately represents the duck head and/or duck body. The density of the durable urethane microcellular elastomer mixture allows the mixture material to flow into the mold. The liquid mixture completes its reaction with the aid of heat imparted to the mold.

The molded outer shell and buoyant material are removed from the pliable mold. A suitable keel is inserted into the opening defined by the buoyant material and the outer shell.

In a preferred method, the fixture further includes a member (not shown) which extends at substantially a right angle from the fixture in an upward direction. When the outer shell material is molded around the keel and buoyant material, the extending member forms the interior opening 46 within the decoy.

From the foregoing, it will be seen that this invention is well adapted to obtain all the ends and of objects set forth herein together with other advantages which are inherent to the structure.

It will be understood that certain features and subfeatures and subcombinations are of utility and may be employed without reference to other features and subcombinations. This is contemplated by and within the scope of the present invention.

Since many possible embodiments may be made of the invention without departing from the scope thereof, it is to be understood that all matter herein set forth or shown in the accompanying drawings is to be interpreted as illustrative and not in a limiting sense.

We claim:

1. A water fowl decoy comprising
   an outer body having the shape of a desired water fowl, the outer body comprising a buoyant urethane microcellular elastomer material having a density of between about 15 to about 45 $lb/ft^3$;
   the buoyant outer core material being molded around a buoyant core material, the buoyant core material having a density of between about 1.0 to about 8.0 $lb/ft^3$;
   the buoyant outer body having a bottom which defines an opening defined by a front wall, two side walls, and a rear wall, at least one of the front and side walls defining at least one indentation; and
   a removable keel at least partially positioned within the opening in the buoyant outer body and extending into the buoyant core material, the keel having a front edge and a rear edge, at least one of the front and rear edges of the keel defining at least one detent that matingly engages the corresponding indentation on the front and/or back side walls of the opening in the bottom of the buoyant outer body whereby the keel is held in the opening by the detents and capable of being removed from the elastomeric buoyant outer body.

2. The decoy of claim 1, wherein the buoyant core material comprises a urethane foam.

3. The decoy of claim 1, wherein the buoyant core material comprises a polystyrene type material.

4. The decoy of claim 1, wherein the outer body further includes a removable head member.

5. the decoy of claim 4, wherein the head member is removable attached to a front portion of the outer body using a suitable fastening means which extends through the outer body.

6. The decoy of claim 5, wherein the head member comprises the same material as the outer body.

7. The decoy of claim 1, wherein the keel includes at least one weight.

8. The decoy of claim 7, wherein the weight is positioned adjacent a lower edge of the keel.

* * * * *